US008106560B2

(12) United States Patent
Mori

(10) Patent No.: US 8,106,560 B2
(45) Date of Patent: Jan. 31, 2012

(54) STIFFNESS OF BRUSHLESS MOTOR INCLUDING STATOR CORE AND DISK DRIVE

(75) Inventor: Shigeyoshi Mori, Shizuoka (JP)

(73) Assignee: Alphana Technology Co., Ltd., Shizuoka (JP)

(*) Notice: Subject to any disclaimer, the term of this patent is extended or adjusted under 35 U.S.C. 154(b) by 389 days.

(21) Appl. No.: 12/406,055

(22) Filed: Mar. 17, 2009

(65) Prior Publication Data

US 2009/0236927 A1 Sep. 24, 2009

(30) Foreign Application Priority Data

Mar. 18, 2008 (JP) ................. 2008-070113

(51) Int. Cl.
*H02K 3/18* (2006.01)
*H02K 7/00* (2006.01)
*H02K 7/08* (2006.01)
*H02K 1/22* (2006.01)
(52) U.S. Cl. ....... 310/195; 310/67 R; 310/90; 310/261.1
(58) Field of Classification Search .................. 310/195, 310/216, 67 R, 90, 254.1, 261.1
See application file for complete search history.

(56) References Cited

U.S. PATENT DOCUMENTS

| 6,728,063 B1* | 4/2004 | Gustafson et al. ......... 360/99.08 |
| 2004/0150286 A1* | 8/2004 | Godo et al. .................. 310/216 |

FOREIGN PATENT DOCUMENTS

| JP | 05-038115 | 2/1993 |
| JP | 2006-196139 | 7/2006 |

* cited by examiner

*Primary Examiner* — Quyen Leung
*Assistant Examiner* — Jose Gonzalez Quinones
(74) *Attorney, Agent, or Firm* — Fulwider Patton LLP

(57) ABSTRACT

A brushless motor is provided. A stator core has a plurality of teeth extending radially from an annular portion of the stator core. The number of the teeth is an integral multiple of the number of coil-drive phases. Coil relief holes for allowing coils to enter are formed on the motor base. The number of the coil relief holes is less than the number of the teeth by the number of the coil-drive phases multiplied by N (N is a natural number). The number of turns of the motor-drive coil wound around one of the teeth corresponding to a portion of the motor base where the coil relief hole is not formed is set to less than that corresponding to a portion of the motor base where the coil relief hole is formed.

10 Claims, 6 Drawing Sheets

US 8,106,560 B2

STIFFNESS OF BRUSHLESS MOTOR INCLUDING STATOR CORE AND DISK DRIVE

CROSS-REFERENCE TO RELATED APPLICATIONS

This application claims priority from Japanese Application No. 2008-070113, filed Mar. 18, 2008.

BACKGROUND OF THE INVENTION

1. Field of the Invention

The present invention relates to both a brushless motor including stator core for spinning/driving disks such as hard disks, optical disks, or the like and to a disk drive mounting this brushless motor thereon.

2. Brief Description of Related Art

A brushless motor including stator core generally comprises a stator, which is a stationary part, and a rotor, which is a part that rotates relative to the stator. More specifically, the motor comprises a motor shaft, a rotator, an annular magnet for driving the motor, a stator core, and a motor base. The rotator is supported rotatably about the motor shaft. The annular magnet is attached around the periphery of the rotator and rotates with the rotator as a unit. The stator core faces the annular magnet with a small gap, and a plurality of coils for driving the motor are wound around some parts of the stator core. The motor base supports the motor shaft either rotatably or fixedly, and mounts the stator core thereon.

This type of brushless motor including stator core is widely used as a rotary drive for electronic devices. When applying this type of brushless motor to a disk drive in which disks such as hard disks or optical disks are attached on the rotator at the rotor side, thin brushless motors including stator core and thin disk drives are required. In one example, a stator core is attached on a motor base. The stator core has a plurality of teeth protruding from an annular portion of the core, the teeth facing an annular magnet with a small gap, the magnet used for driving the motor and attached around the periphery of the rotator. A portion of each of a plurality of coils for driving the motor wound around the plurality of teeth enters a corresponding one of a plurality of coil relief holes used for allowing coils to escape. See, for example, Japanese patent application: Publication No. H5-38115 (hereinafter referred to as patent document 1) and Japanese patent application: Publication No. 2006-196139 (hereinafter referred to as patent document 2).

A brief explanation will be given of a spindle motor disclosed in the patent document 1 cited above (Japanese patent application: Publication No. H5-38115). Figures are not shown herein and the explanation will be given while referring to the patent document 1. This spindle motor comprises: a shaft member of which one end fits into a cylindrical part entered from the approximate center of a motor base (base plate); a hub rotatably supported by the shaft member via a shaft bearing; a rotor magnet fixedly attached around the outer surface of the hub; a stator core attached on the motor base, the core facing the rotor magnet; and a plurality of coils for driving the motor, the coils wound around the stator core, wherein a plurality of holes (windows) for allowing the coils to escape are provided at a predetermined pitch along the circumferential direction on the motor base. By allowing a portion of each of the plurality of motor-drive coils wound around the stator core to enter its corresponding hole used for allowing the coils to escape, the length of the spindle motor along the shaft can be shortened, i.e., a thinner motor can be provided without reducing the thickness of the motor base.

Further, a brief explanation will be given of a disk drive disclosed in the patent document 1 cited above (Japanese patent application: Publication No. 2006-196139) while referring to the patent document 2 (figures are not shown herein). This disk drive comprises: a motor base; a cylindrical bearing supporter disposed at approximately at the center of the motor base; a bearing held inside the bearing supporter; a stator core disposed circumferentially around the bearing supporter; a rotating shaft supported by the bearing; a turntable fixed on the rotating shaft; an annular rotor yoke disposed external circumference of the turntable; an annular magnet disposed in the rotor yoke, facing to the stator core; and a disk holder disposed at the center of a surface, the surface being on the other side of the surface that faces the motor base. By providing a plurality of holes (openings) for allowing a portion of each of the coils wound around the stator cores to enter, it becomes possible to make the motor base lighter and to make the whole device lighter and thinner.

A brief explanation will now be given of a conventional brushless motor including stator core to which the technical approach described in patent document 1 and 2 is applied and of a disk drive on which this conventional brushless motor is mounted while referring to FIG. 1~FIG. 3.

FIG. 1 shows a vertical cross-sectional view along with the O-X2 line indicated in FIG. 2 in order to explain a conventional brushless motor including stator core. FIG. 2 is a bottom view of a conventional disk drive mounting the conventional brushless motor thereon. FIG. 3 is a schematic vertical cross-sectional view of the conventional brushless motor, illustrating a state where the motor base is deformed when an acceleration is given to the direction along the trajectory of the head, which is perpendicular to the motor shaft.

The conventional brushless motor 100 including stator core is configured to be thin so as to be suitable for driving disks as shown in FIG. 1 and FIG. 2.

The conventional brushless motor 100 is disposed and attached at a proper position in a housing 121, which forms the exterior appearance of the conventional disk drive 120, the position corresponding to the trajectory of the magnet head 124, which will be described later. Further, a disk D is rotatably mounted on the brushless motor 100.

In the case where a hard disk is used as the disk D, the magnetic head 124, fixedly attached on the tip of an arm 123 swingably supported by an arm-holding shaft 122 provided in the housing 121, moves in a radial direction so that information signals are recorded or replayed by the magnetic head 124 to/from the hard disk.

As shown in FIG. 1, the conventional brushless motor 100 comprises a stator S, which is a stationary part, and a rotor R, which is a part that rotates relative to the stator S.

First, in the conventional brushless motor 100 described above, at the stator S side, which is a stationary part, a motor base 101 is formed using, for example, an electrolytic zinc-coated steel plate, into a flanged concave-cup shape including: a cylindrical part 101a protruding upward at the center of the plate; a concavely-cupped part 101b that connects to the external circumference of the cylindrical part 101a and recessed downward in the shape of a concave cup; and an annular flange 101c surrounding the concavely-cupped part 101b and protruding upwards.

As shown in FIG. 1 and FIG. 2, on the concavely-cupped part 101b of the motor base 101, a plurality of rectangular-shaped coil relief holes 101b1 for allowing the coils to escape are bored, the coil relief holes penetrating the base and being almost equally angularly-spaced along the circumference. In case the coil-drive phase of the motor drive coil 104 is, for example, three and the motor has nine slots, nine coil relief holes 101b1 are bored onto the base.

Assuming one coil relief hole 101b1 of the nine coil relief holes 101b1 is formed on the line O-X2 passing through the center O of the motor shaft 108 and disposed at the magnetic head 124 side on the motor base 101, then the one coil relief hole 101b1 formed on the line O-X2 generally lies along the direction of the trajectory of the magnetic head 124.

A ring-shaped bearing member 102 is fit into the cylindrical part 101a formed at the center of the motor base 101. On the internal surface of the bearing member 102, fluid dynamic pressure grooves 102a and 102b are separately formed at an axially-upper position and at an axially-lower portion in the axial direction, respectively. For the fluid dynamic pressure grooves, for example, a haring-bone shape can be adopted.

Further, on the external circumference of the concavely-cupped part 101b of the motor base 101, a stator core 103 is fixedly mounted. The stator core 103 is formed by a laminated structure of, for example, silicon steel sheets. An annular portion 103a of the core is formed on the outer side of the stator core 103, and on the annular portion 103a, nine equally circumferentially-spaced teeth 103b are formed radially inwardly.

Around each of the nine teeth 103b formed on the stator core 103, a motor drive coil 104 is wound, and a portion of each of the nine motor drive coil 104 enters one of the nine coil relief holes 101b1 fused or allowing the coil to escape formed on the concavely-cupped part 101b of the motor base 101, by which, the brushless motor 100 is made to be thin.

Next, on the rotor side R described above, motor shaft 108 made of stainless steel is fixedly attached in the center hole 107a bored at the center of the rotator made of aluminum (herein after referred to as "rotor hub" 107). This motor shaft 108 rotatably fits into the fluid dynamic pressure grooves 102a and 102b of the bearing member 102 on the stator S side. On the lower end of the motor shaft 108, a thrust plate 105 at the stator side that bears the thrust load and a support plate 106 that strengthens the thrust plate 105 are attached.

The upper portion of the bearing member 102 provided at the stator S side faces a backside center concave part 107b formed concavely in the center of the backside of the rotor hub 107.

Around the external circumference of the rotor hub 107, the small-diameter part 107c is formed at the lower position, the large-diameter part 107d is formed above the small-diameter part 107c, and medium-diameter part 107e is formed above the large-diameter part 107d.

Around the external circumference of the small-diameter part 17c of the 17, a motor-drive annular magnet 109 is fixedly attached, and nine teeth 103b formed on the stator core 103 face the motor-drive annular magnet 109 with a small gap.

The lower disk D is mounted on the large-diameter part 107d of the rotor hub 107. Above the lower disk D, an upper disk D is mounted via an annular spacer 110 fit in the medium-diameter part 107e of the rotor hub 107, the upper disk D being held by a clamp 111. Further, the clamp 111 is fixed on the motor shaft 108 by a screw 112.

When operating the conventional brushless motor 100 configured as described above and recording/retrieving information signals to/from the disk D using the magnetic head 124, swingably supported by the arm-holding shaft 122 disposed in the housing 121, provided no external jolting or shaking is given to the conventional brushless motor 100, the magnetic head 124 can be positioned on a desired track on the disk D, i.e., the magnetic head 124 is on track.

However, as shown in FIG. 3, in the case where an external jolting and/or shaking is given so that acceleration FA in the direction of the trajectory of the magnetic head 124, which generally intersects with the motor shaft 108 at a right angle, is given, since the one coil relief hole 101b1 of the plurality of coil relief holes bored onto the concavely-cupped part 101b of the motor base 101 is formed generally along the direction of the trajectory of the magnetic head 124 (direction O-X2) as described above, the motor base 101 is skewed generally in the direction of the trajectory of the magnetic head 124 by the acceleration FA described above. This skew causes displacement in the relative position between the disk D and the magnetic head 124, and, thus, the magnetic head 124 is positioned off the desired track on the disk D, i.e., the magnetic head 124 is off-track. As a result, the information data may not be retrieved or recorded properly.

SUMMARY OF THE INVENTION

In order to provide thinner motors and thinner disk drives, in a brushless motor including stator core or in a disk drive mounting the brushless motor thereon, a portion of each of a plurality of motor-drive coils wound around stator cores are allowed to enter corresponding coil relief holes. Therefore, it is highly desirable that even if an acceleration in the direction along the trajectory of the head is given, the direction being perpendicular to the motor shaft, no skew to the motor base is caused and thus the head does not move off the predetermined track and no "off track" status occurs.

According to one exemplary embodiment of the present invention, a brushless motor including a stator core is provided. The brushless motor comprises: a rotor to which a driving magnet is attached; a stator core arranged to give magnetic drive power to the driving magnet; and a motor base on which a stator core is fixed. The stator core comprises a magnetic flux generator generating a magnetic flux to drive the driving magnet when drive current flows through a wound coil. The magnetic flux generator is formed on a portion of the stator core excluding a certain section defined by a predetermined angle around a rotational axis of the rotor, the predetermined angle defining the certain section is larger than a minimum angle of angles formed by adjacent magnet flux generators.

The features and advantages of the invention will be more readily understood from the following detailed description which should be read in conjunction with the accompanying drawings.

DETAILED DESCRIPTION OF THE PREFERRED EMBODIMENTS

A detailed description will be given below of one exemplary embodiment of a brushless motor and a disk drive according to the present invention while referring to the FIG. 4, FIG. 5, FIG. 6A, FIG. 6B, FIG. 7A, and FIG. 7B.

Figure 4:
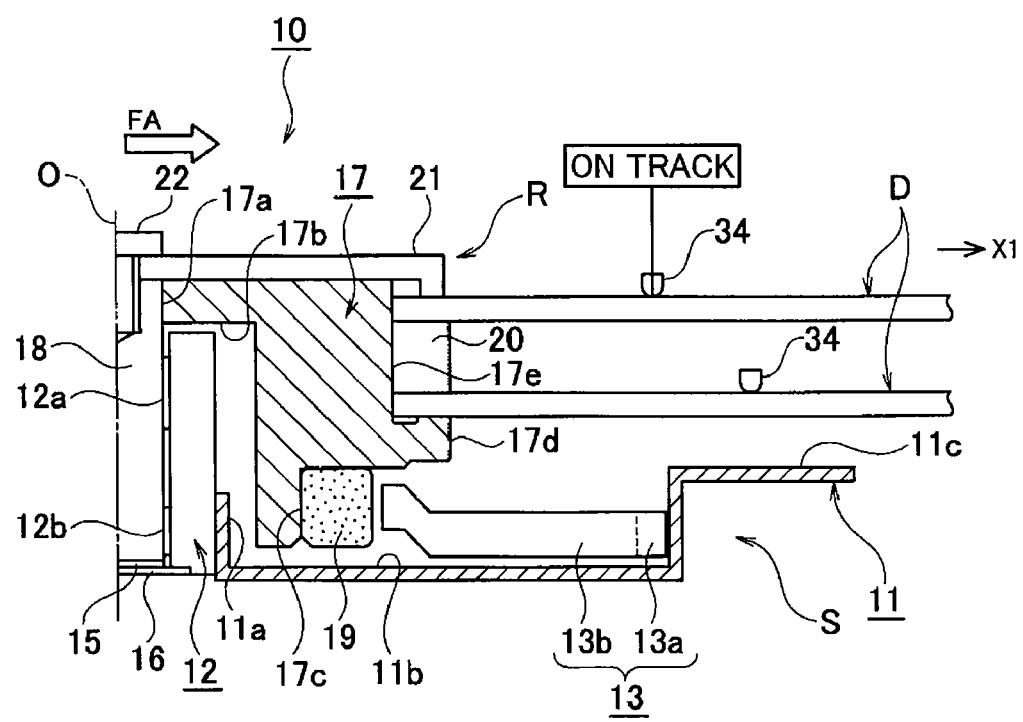
FIG. 4 is a vertical cross sectional view along section O-X1 of FIG. 6A, illustrating a brushless motor including stator core according to the present invention.
Figure 5:
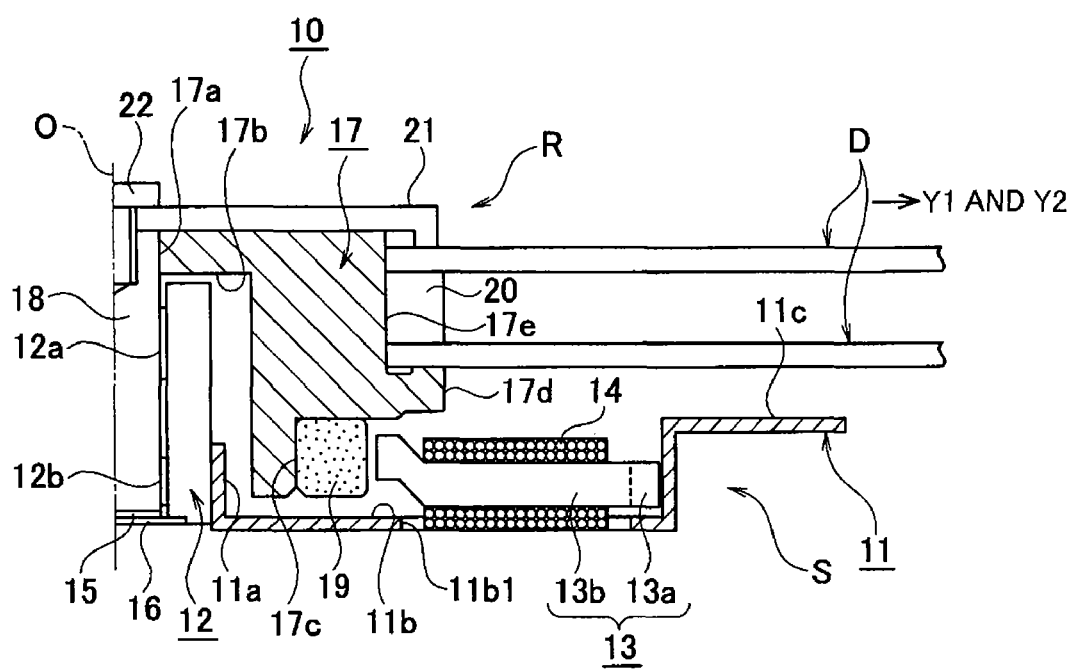
FIG. 5 is a vertical cross sectional view along section O-Y1 and O-Y2 of FIG. 6A, illustrating a brushless motor including stator core according to the present invention.
Figure 6A:
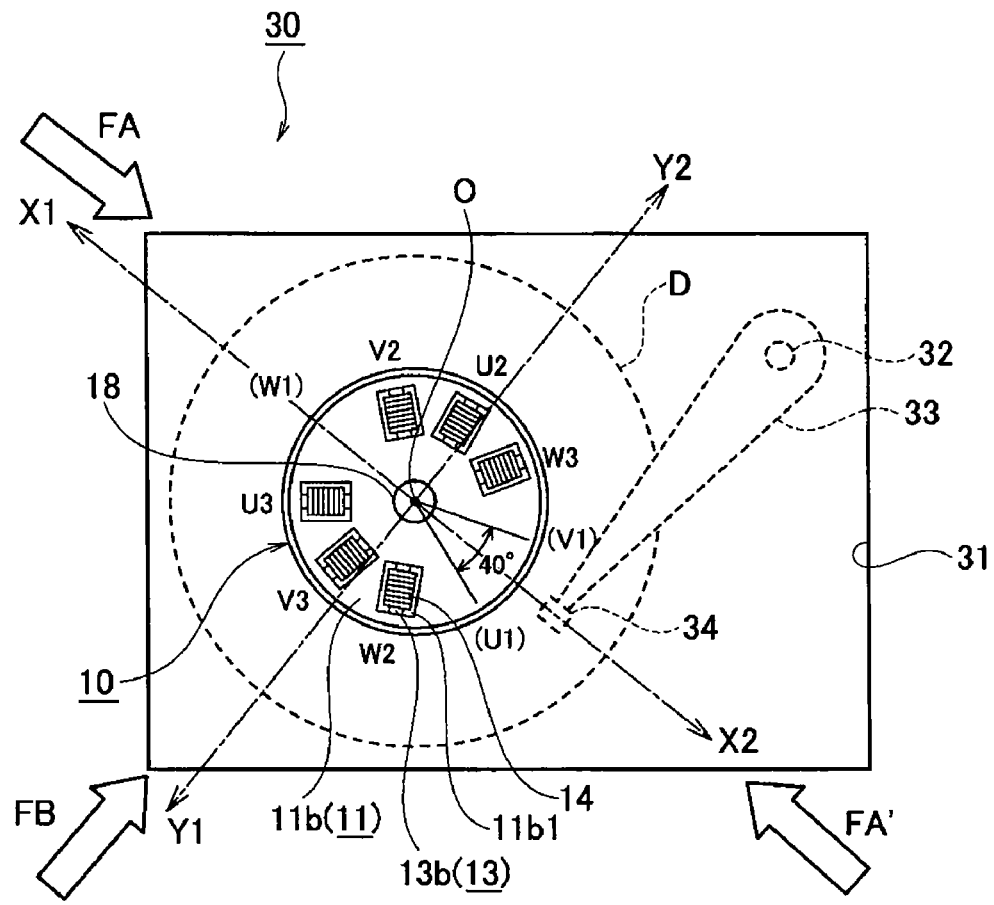
FIG. 6A is a bottom view of the disk drive according to the present invention mounting the brushless motor including stator core according to the present invention thereon.
Figure 6B:
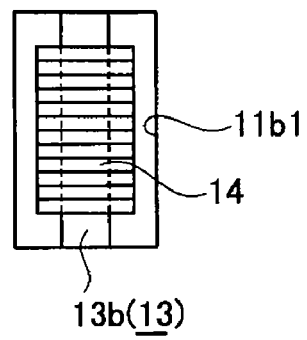
FIG. 6B illustrates a portion of the disk drive according to the present invention mounting the brushless motor including stator core according to the present invention thereon, the figure illustrating an enlarged view of the vicinity of a coil relief hole.

FIG. 4 is a vertical cross sectional view of section O-X1 of FIG. 6A, illustrating a brushless motor including stator core according to the present invention. FIG. 5 is a vertical cross sectional view of section O-Y1 and O-Y2 of FIG. 6A, illustrating a brushless motor including stator core according to the present invention. FIG. 6A is a bottom view of the disk drive according to the present invention mounting the brushless motor including stator core according to the present invention thereon. FIG. 6B is an enlarged view of the vicinity of a coil relief hole.

As shown in FIG. 4, FIG. 5, FIG. 6A, and FIG. 6B, a brushless motor 10 including stator core according to the present invention is provided for driving disks and configured as a thin motor having, for example, three coil-drive phases and nine slots.

The brushless motor 10 according to the present invention is disposed and attached at a proper position in a housing 31, which forms the exterior appearance of the disk drive 30 according to the present invention, the position corresponding to the trajectory of the magnet head 34, which will be described later. Further, a disk D is rotatably mounted on the brushless motor 10.

In the case of adopting a hard disk as the disk D, a magnet head 34, fixedly attached on the tip of an arm 33 swingably supported by an arm-holding shaft 32 provided in the housing 31, moves in the radial direction of the hard disk and the magnetic head 34 records/replays information signal to/from the hard disk.

In the case where an optical disk is adopted as the disk D, an optical head (not shown) may be provided so as to be movable in a straight line in the radial direction of the optical disk.

As shown in FIG. 4 and FIG. 5, the brushless motor 10 according to the present invention comprises a stator S, which is a stationary part, and a rotor R, which is a part that rotates relative to the stator S.

First, in the brushless motor 10 described above according to the present invention, at the stator S side, which is a stationary part, a motor base 11 is formed, using for example electrolytic zinc-coated steel plate, in a flanged concave-cup shape including: a cylindrical part 11a protruding upward at the center of the base; a concavely-cupped part 11b connecting to the external circumference of the cylindrical part 11a and recessing downwards in the shape of a concave cup; and an annular flange 11c surrounding the concavely-cupped part 11b and protruding upwards.

As shown in FIG. 4 and FIG. 6A, on the concavely-cupped part 11b of the motor base 11, no coil relief hole for allowing the coils to escape is formed on a line X1-O-X2 passing through the center point O of the motor shaft 18. This line X1-O-X2 lies approximately in the direction of the trajectory of the magnet head 34. Further, no coil relief hole is formed in the vicinity of the line X1-O-X2 at the both side of the line.

Meanwhile, as shown in FIG. 5, FIG. 6A, and FIG. 6B, on the concavely-cupped part 11b of the motor base 11, at each side of the X1-O-X2 passing through the center point O of the motor shaft 18, three coil relief holes 11b1 (i.e., six holes in total) are bored through in a rectangular shape, being disposed in the circumferential direction.

Referring back to FIG. 4 and FIG. 5, a ring-shaped bearing member 12 fits into the cylindrical part 11a formed at the center of the motor base 11. On the inner surface of the bearing member 12, fluid dynamic pressure grooves 12a and 12b are separately formed at an axially-upper position and at an axially-lower position, respectively. The fluid dynamic pressure grooves 12a and 12b are formed in a haring-bone shape or the like.

Further, on the external circumference of the concavely-cupped part 11b of the motor base 11, a stator core 13 is fixedly mounted, the stator core 13 is formed by a laminated structure of, for example, silicon steel sheets. An annular portion 13a of the core is formed on the outer side and from the annular portion 13a of the core, is formed on the outer side of the stator core 13, and on the annular portion 13a, nine equally circumferentially-spaced teeth 13b are formed radially inwardly.

In this exemplary embodiment, the number of the teeth 13b of the stator core 13 is typically set to an integral multiple of the coil-drive phase number for driving a plurality of motor-drive coils 14 described later. Thus, in case the coil-drive phase number is three, the number of the teeth 13b would be six, nine, or twelve. In this exemplary embodiment, the number of the teeth 13b is nine in correspondence with nine slots.

Further, one tooth 13b of the nine teeth 13b is disposed along a line O-X1 passing through the center point O of the motor shaft 18 and lying at the other side of the magnetic head 34 on the motor base 11. With reference to the one tooth 13b, the remaining eight teeth are disposed in a circumferential array disposed 40° apart from a proximate teeth. Therefore, no tooth 13b is located on the line O-X2 passing through the center point O of the motor shaft 18 and lying at the magnetic head 34 side on the motor base 11.

In a three-phase, nine-slot case, the plurality of motor drive coils 14 wound around the stator core 13 typically consists of nine coils comprising: a) three coils for U-phase U1, U2, and U3; b) three coils for V-phase V1, V2, and V3; and c) three coils for W-phase W1, W2, and W3. In this exemplary embodiment, as shown in FIG. 6A, the number of turns of one coil for each phase (U-phase, V-phase, and W-phase), for example coils U1, V1 and W1, are reduced by approximately the same number of turns compared to the other coils U2, U3, V2, V3, W2, and W3. Alternatively, the number of turns of the coils U1, V1 and W1 are set to zero. In this manner, by reducing the number of turns of the coils approximately by a same number of turns for each phase (U-phase, V-phase, and W-phase), or by setting the number of turns of the coils to zero, the torque ripple is prevented from worsening.

The coil W1, of which the number of turns is reduced or set to zero, is wound around one tooth 13b located along the line O-X1, and coils U1 and V1, of which the number of turns are reduced or set to zero, are wound around teeth 13b disposed in vicinity of the symmetric positions ±20° apart from the line O-X2 as shown in FIG. 6A. Therefore, there is no need to bore a coil relief hole for coils W1, U1, and V1 onto the concavely-cupped part 11b of the motor base 11, by which, a coil relief hole is formed neither on the line X1-O-X2 nor the vicinity of the both sides of the line X1-O-X2 on the concavely-cupped part 11b of the motor base 11.

Meanwhile, at one side of the line X1-O-X2 passing through the center point O of the motor shaft 18 on the motor base 11, coils U3, V3, and W2 are disposed, being wound around one of the teeth 13b respectively as shown in FIG. 6A and FIG. 6B. These coils have a larger number of turns than the coils W1, U1, and V1. Also at the other side of the line X1-O-X2, coils V2, U2, and W3 are disposed, being wound around one of the teeth 13b respectively as shown in FIG. 6A and FIG. 6B. These coils have larger number of turns than the coils W1, U1, and V1. The coils U3, V3, W2, V2, U2, and W3 are inserted into one of the six coil relief holes 11b1, respectively, each hole formed on the concavely-cupped part 11b of the motor base 11. This enables one to provide thinner brushless motors 10 and thinner disk drives 30.

According to the above description, the number of the coil relief holes 11b1 on the concavely-cupped part 11b of the motor base 11 can be represented by the following equation 1.

$$\text{Number of the coil relief holes} = \{\text{number of teeth} - (\text{coil-drive phase number multiplied by } N)\}, \quad \text{[equation 1]}$$

where N is a natural number.

In the case of a motor having three coil-drive phases and nine slots such as in this exemplary embodiment, by substituting the number of teeth=9, coil-drive phase number=3, and N=1, the number of the coil relief holes 11b1 to be provided is six. That is, coil relief holes 11b1 are formed on the concavely-cupped part 11b of the motor base 11 by the number that is coil-drive phase number×N less than the number of the teeth 13b.

Next, in the brushless motor 10 according to the present invention described above, on the rotor side R, a motor shaft 18 made of stainless steel is fixedly attached in the center hole 17a bored at the center of a rotator made of aluminum (herein after referred to as "rotor hub" 17). This motor shaft 18 rotatably fits into the fluid dynamic pressure grooves 12a and 12b of the bearing member 12 on the stator S side. On the lower end of the motor shaft 18, a thrust plate 15 at the stator side that bears the thrust load and a support plate 16 that strengthens the thrust plate 15 are attached.

The upper portion of the bearing member 12 mounted on the stator S side faces a backside center concave part 17b formed concavely at the center of the backside of the rotor hub 17.

Around the external circumference of the rotor hub 17, the small-diameter part 17c is formed at the lower position, the large-diameter part 17d is formed above the small-diameter part 17c, and medium-diameter part 17e is formed above the large-diameter part 107d.

Around the external circumference of the small-diameter part 17c of the 17, a motor drive annular magnet 19 is fixedly attached, and nine teeth 13b formed on the stator core 103 face to the motor drive annular magnet 19 with a small gap.

The lower disk D is mounted on the large-diameter part 17d of the rotor hub 17. Above the lower disk D, an upper disk D is mounted via an annular spacer fit in the medium-diameter part 17e of the rotor hub 17, the upper disk D being held by a clamp 21. Further, the clamp 21 is fixed on the motor shaft 18 by a screw 22.

When operating the brushless motor 10 according to the present invention configured as described above and recording/retrieving information signals to/from the disk D using the magnetic head 34, swingably supported by the arm-holding shaft 32 in the housing 31, even if an external jolting and/or shaking occurs with the brushless motor 10 according to the present invention, and an acceleration FA or FA' in the direction of the trajectory of the magnet head 34, which generally intersects with the motor shaft 18 at a right angle, as shown in FIG. 4 and FIG. 6A, since no coil relief hole is formed on the line X1-O-X2 or in the vicinity of both sides of the line X1-O-X2 on the concavely-cupped part 11b of the motor base 11, the stiffness of the motor base 11 is increased, by which, no skew occurs with the motor base 11. Therefore, relative position between the disk D and the magnetic head 34 does not change, and the magnetic head 34 can be disposed above on a predetermined track on the disk D, i.e., the magnetic head 34 can be set on track securely, by which, a reliable brushless motor 10 can be provided.

Figure 3:
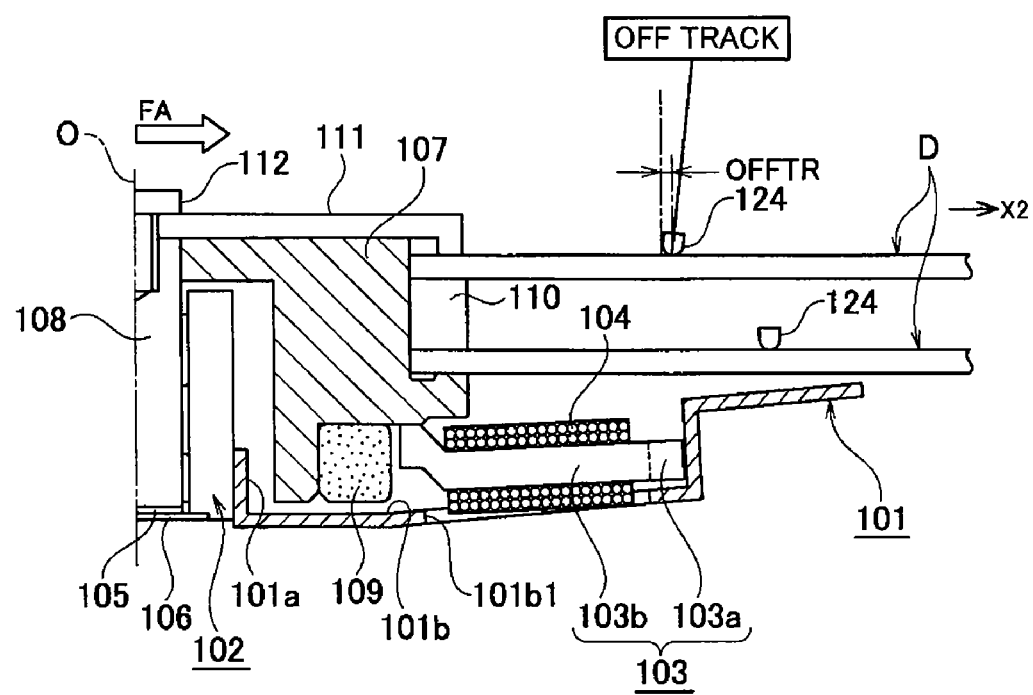
FIG. 3 is a schematic vertical cross-sectional view of the conventional brushless motor including stator core, illustrating a state where a motor base is deformed when the acceleration is given in the direction of the trajectory of the head, the trajectory generally intersecting with the motor shaft at a right angle.

The simulation result of off-track quantity of the head OFFTR (FIG. 3) given at the same radius position on the disk D is given for two cases below, assuming the given value of acceleration FA in the direction along the trajectory of the magnetic head 34, the trajectory intersecting with the motor shaft 21 at a right angle.

Figure 1:
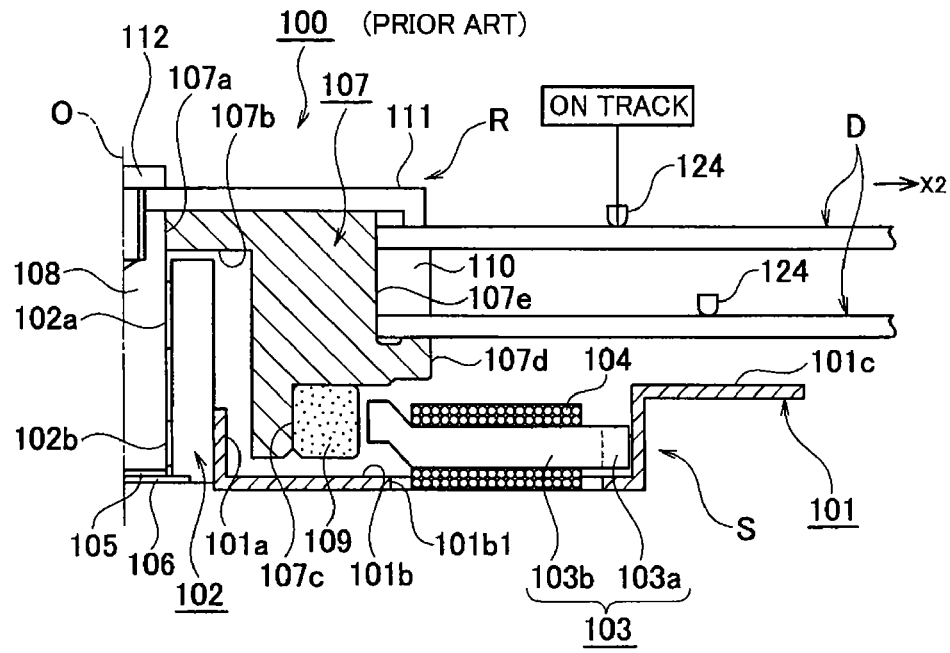
FIG. 1 is a vertical cross-sectional view along section O-X2 of FIG. 2, illustrating conventional brushless motor including stator core.
Figure 2:
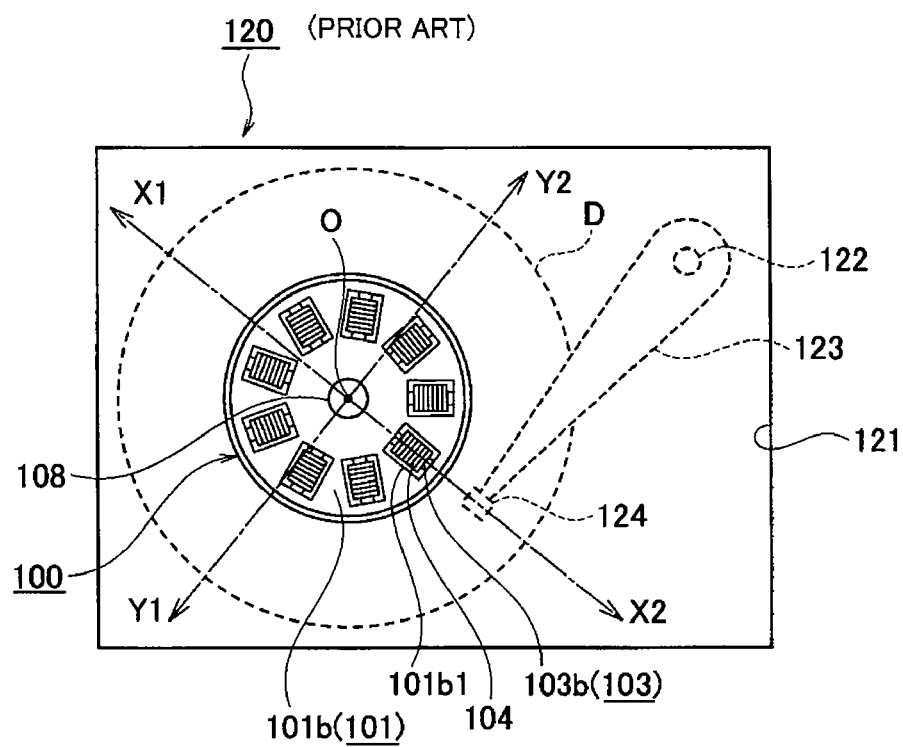
FIG. 2 is a bottom view of a conventional disk drive mounting the conventional brushless motor including stator core thereon.

In one case, the number of coil relief holes is the same as the number of the teeth on the stator core, as shown in the related art examples of FIG. 1 and FIG. 2. In the other case, the number of coil relief holes is less than the number of teeth of the stator core, as in the exemplary embodiment shown in FIG. 4, FIG. 5, FIG. 6A, and FIG. 6B.

In the case of the related art example: the off-track quantity of the head OFFTR=0.72 μm.

In the case of the exemplary embodiment: the off track quantity of the head OFFTR=0.60 μm.

The value for the exemplary embodiment is improved by 17 percent as compared to the related art example. Therefore, according to the present exemplary embodiment, the reading or writing operation of the information signal from/to the disk D by the magnetic head 34 can be performed in a proper condition and with reliability.

Although an explanation is given in the foregoing exemplary embodiment, only in relation to a motor with three coil-drive phases and nine slots, the coil-drive phase number and the slot number are not limited to those and other combinations are also applicable to the invention. A brief explanation will be given in the following while referring to FIG. 7A and FIG. 7B, regarding one of the variations of the exemplary embodiment according to the present invention in relation with a motor having two coil-drive phases and eight slots.

Figure 7A:
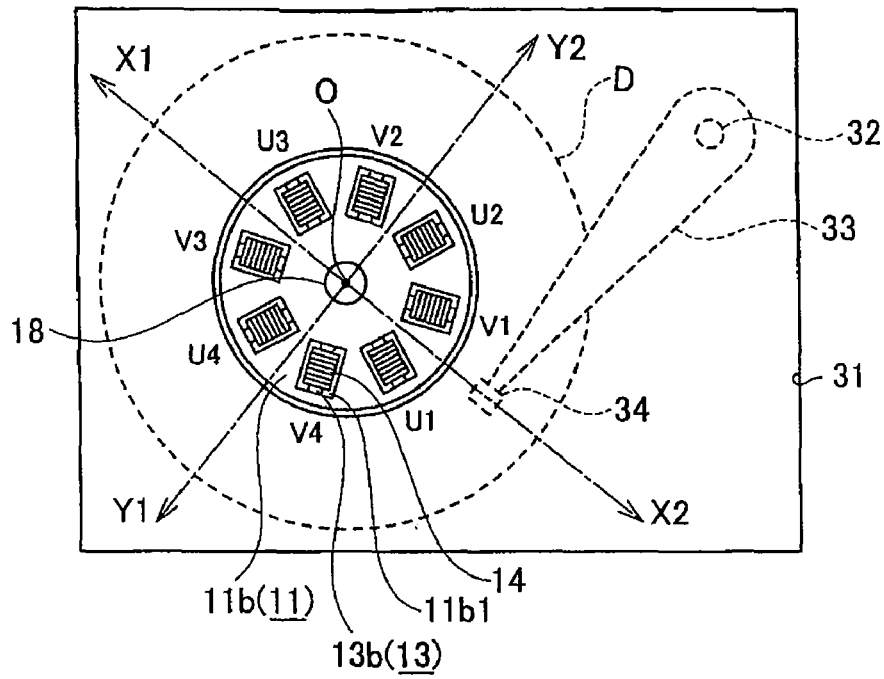
FIG. 7A illustrates a comparative example.
Figure 7B:
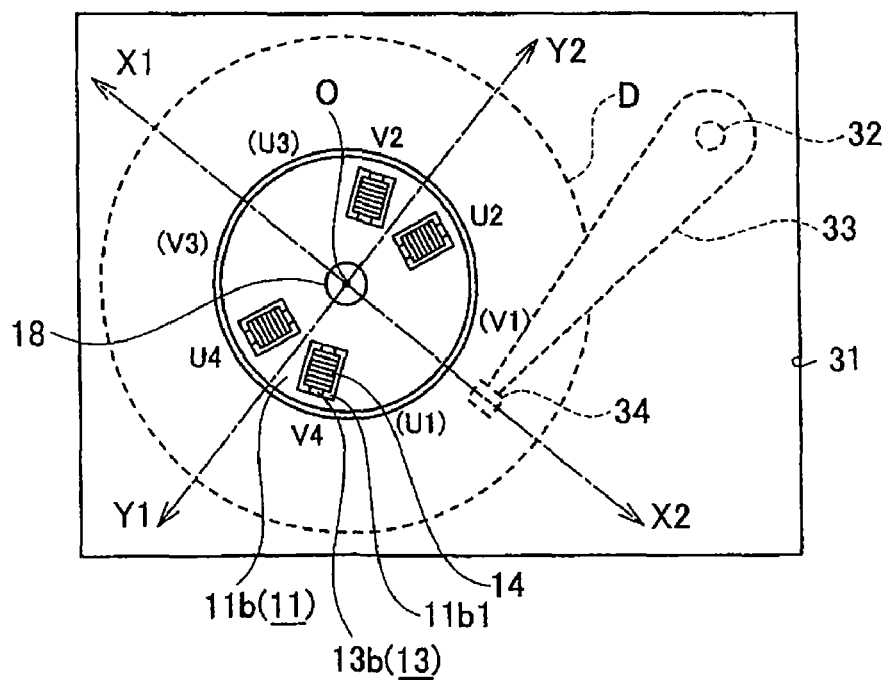
FIG. 7B is a schematic view of a variation of an exemplary embodiment of the present invention having two phases and eight slots.

FIG. 7B is a schematic view of one of the variations of the present invention where a motor has two phases and eight slots. FIG. 7A illustrates a comparative example.

In the comparative example shown in FIG. 7A, a typical motor having two coil-drive phases and eight slots is illustrated. In this case, eight motor drive coils 14, comprising coils U1~U4 for the U-phase and coils V1~V4 for the V-phase, are wound around eight teeth 13b of the stator core 13 that are disposed alternately for the U-phase and the V-phase. Eight coil relief holes 11b1 used for allowing these eight motor drive coils 14 to enter are bored, distributed equidistantly on the concavely-cupped part 11b of the motor base 11.

In this example, no coil relief hole is disposed on the line X1-O-X2 along the direction of the trajectory of the magnetic head 34 on the concavely-cupped part 11b of the motor base 11. However, the motor base 11 is skewed because of the four coil relief holes 11*b*1 that allow the four coils U1, V1, U3, and V3 disposed in the vicinity of both side of the line X1-O-X2, to enter.

In the variation example of the present invention shown in FIG. 7B, the motor has two coil-drive phases and eight slots. No coil relief hole is bored on the line X1-O-X2, which lies along the direction of the trajectory of magnetic head 34 on the concavely-cupped part 11*b* of the motor base 11. The number of turns of four coils U1, U3, V1, and V3, which are disposed in the vicinity of both side of the line X1-O-X2, is either reduced as compared to the other coils or set to zero. By this way, provisions of coil relief holes in the vicinity of both sides of the line X1-O-X2 at a position corresponding to these four coils U1, U3, V1, and V3 become unnecessary, and therefore, it becomes possible to constrain the skew of the motor base 11.

Therefore, in the variation example of the present invention shown in FIG. 7B, where the motor has two coil-drive phases and eight slots, by substituting the number of teeth=8, coil-drive phase number=2, and N=2, into the equation 1 described in the foregoing exemplary embodiment, the number of the coil relief holes 11*b*1 to be provided is four. That is, coil relief holes 11*b*1 are formed on the concavely-cupped part 11*b* of the motor base 11 by the number that equals to the coil-drive phase number N less than the number of the teeth 13*b*.

Although the motor shaft 18 of the brushless motor 10 is explained in the foregoing exemplary embodiment only in relation to a rotating-shaft type where the motor shaft 18 spins with the rotor hub 17 as a unit, the motor shaft 18 may also be a fixed-shaft type in which the motor shaft is fixedly supported on the motor base and in which the motor shaft supports the rotor hub rotatably, as a matter of course (not shown).

Although the brushless motor 10 is explained in the foregoing exemplary embodiment only in relation to an inner-rotor-type brushless motor 10 in which the motor-drive magnet 19 is disposed inside the stator core 13, the brushless motor 10 is not limited to this; the invention can also be applied to the outer-rotor type brushless motor in which the motor-drive magnet surrounds the stator core (not shown).

The invention may be embodied in other forms without departure from the spirit and essential characteristics thereof. The embodiments described therefore are to be considered in all respects as illustrative and not restrictive. Although the present invention has been described in terms of certain preferred embodiments, other embodiments that are apparent to those of ordinary skill in the art are also within the scope of the invention. Accordingly, the scope of the invention is intended to be defined only by reference to the appended claims.

What is claimed is:

1. A brushless motor mounted on a disk drive comprising:
a motor shaft;
a head being movable in a radial direction of a disk;
a rotor arranged to mount a disk, the rotor rotatably supported by the motor shaft;
a motor-driving annular magnet arranged to drive a motor, the magnet fixedly attached around the periphery of the rotor and arranged to rotate with the rotor as a unit;
a stator core facing the motor-driving annular magnet with a small gap and comprising a plurality of teeth, each of which having a polyphase motor-drive coil wound thereupon, and each of which extending radially from an annular portion of the stator core, the number of the teeth being an integral multiple of the number of coil-drive phases; and
a motor base supporting the motor shaft, the motor base arranged to mount the stator core and, having one or more coil relief holes being formed thereon, wherein
each coil relief hole allows the motor-drive coil wound around the teeth to enter, the number of the coil relief holes being less than the number of the teeth by the number of coil-drive phase multiplied by N, where N is a natural number, wherein
the number of turns of the motor-drive coil wound around teeth corresponding to the portion of the motor base where the coil relief holes are not formed is set to less than the number of turns of the motor-drive coil wound around teeth corresponding to the portion of the motor base where the coil relief holes are formed, and wherein
the coil relief holes are not provided for the portion of the motor base corresponding to one line or to the vicinity adjacent to the one line, the one line: a) intersecting with the motor shaft at a right angle on the motor base, b) passing through the center of the motor shaft, and c) lying generally in the direction of the head movement.

2. A disk drive comprising:
a housing arranged to mount the brushless motor of claim 1 therein,
wherein the head is arranged to record or replay an information signal to or from a disk mounted on the rotor.

3. The brushless motor according to claim 1, wherein the head does not exist between the disk and the motor base.

4. The brushless motor according to claim 1, wherein
for the teeth corresponding to the portion of the motor base where the coil relief holes are not formed, the number of teeth for each respective coil-drive phase is the same.

5. The brushless motor according to claim 4, wherein
the number of turns of the motor-drive coil wound around the teeth corresponding to the portion of the motor base where the coil relief holes are not formed is reduced by generally the same amount for each of the coil-drive phases.

6. The brushless motor according to claim 4, wherein
the number of turns of the motor-drive coil wound around the teeth corresponding to the portion of the motor base where the coil relief holes are not formed is set to zero for each of the coil-drive phases.

7. A disk drive comprising:
a brushless motor;
a housing arranged to mount the brushless motor;
a head being movable in a radial direction of a disk mounted on the brushless motor, the brushless motor comprising:
a rotor to which a driving magnet is attached;
a stator core arranged to give magnetic drive force to the driving magnet; and
a motor base on which the stator core is fixed having one or more coil relief holes being formed thereon, wherein
the stator core comprises a magnetic flux generator having a plurality of teeth, each of which having a polyphase motor-drive coil wound thereupon, and each of which extending radially from an annular portion of the stator core, the magnetic flux generator generating a magnetic flux to drive the driving magnet when drive current flows through a polyphase motor-drive coil,
each coil relief hole allows the motor-drive coil wound around the teeth to enter, the number of the coil relief holes being less than the number of the teeth by the number of coil-drive phases multiplied by N, where N is a natural number,
the number of turns of the motor-drive coil wound around teeth corresponding to the portion of the motor base where the coil relief holes are not formed is set to less than the number of turns of the motor-drive coil wound around teeth corresponding to the portion of the motor base where the coil relief holes are formed, the magnetic flux generator is formed on the portion of the stator core excluding a section defined by a predetermined angle around a rotational axis of the rotor, the predetermined angle defining the section being larger than an angle derived from evenly dividing 360-degrees around the axis of the rotor by the number of the magnet flux generators, the section is equally divided by one line, the one line intersecting with the motor shaft at a right angle on the motor base and lying generally in the direction of the head movement, and the coil relief holes are not provided for the portion of the motor base corresponding to the one line or to the vicinity adjacent to the one line.

8. A brushless motor mounted on a disk drive comprising:

a motor shaft;

a head being movable in a radial direction of a disk;

a rotor arranged to mount a disk, the rotor rotatably supported by the motor shaft;

a motor-driving annular magnet arranged to drive a motor, the magnet fixedly attached around the periphery of the rotor and arranged to rotate with the rotor as a unit;

a stator core facing the motor-driving annular magnet with a small gap and comprising a plurality of teeth, each of which having a polyphase motor-drive coil wound thereupon, and each of which extending radially from an annular portion of the stator core, the number of the teeth being an integral multiple of the number of coil-drive phases; and a motor base supporting the motor shaft, the motor base arranged to mount the stator core and having one or more coil relief holes being formed thereon, wherein each coil relief hole allows the motor-drive coil wound around the teeth to enter, the number of the coil relief holes being less than the number of the teeth by the number of coil-drive phases multiplied by N, where N is a natural number, wherein the number of turns of the motor-drive coil wound around teeth corresponding to the portion of the motor base where the coil relief holes are not formed is set to less than the number of turns of the motor-drive coil wound around teeth corresponding to the portion of the motor base where the coil relief holes are formed, and wherein the coil relief holes are formed on the portion of the motor base, the portion excluding a section defined by a predetermined angle around a rotational axis of the rotor, the section being equally divided by one line, the one line a) intersecting with the motor shaft at a right angle on the motor base, b) passing through the center of the motor shaft, and c) lying generally in the direction of the head movement.

9. The brushless motor according to claim 8, wherein the predetermined angle defining the section is greater than or equal to a minimum angle of angles formed by adjacent teeth.

10. The brushless motor according to claim 8, wherein the predetermined angle defining the section is greater than or equal to a minimum angle of angles formed by adjacent coil relief holes.

* * * * *